(12) United States Patent
Jade et al.

(10) Patent No.: US 12,709,178 B2
(45) Date of Patent: Aug. 18, 2026

(54) AUTOMATED MANAGEMENT OF ELECTRIC VEHICLES AND CHARGING INFRASTRUCTURE IN HIGH-DEMAND CONDITIONS

(71) Applicant: Robert Bosch GmbH, Stuttgart (DE)

(72) Inventors: Shyam Jade, Plymouth, MI (US); Ziheng Pan, Farmington Hills, MI (US); Sergio Arturo Garcia Ortega, San Luis Potosi (MX)

(73) Assignee: Robert Bosch GmbH, Stuttgart (DE)

( * ) Notice: Subject to any disclaimer, the term of this patent is extended or adjusted under 35 U.S.C. 154(b) by 424 days.

(21) Appl. No.: 18/162,068

(22) Filed: Jan. 31, 2023

(65) Prior Publication Data

US 2024/0253508 A1 Aug. 1, 2024

(51) Int. Cl.
*B60L 53/63* (2019.01)
*B60L 53/302* (2019.01)
(Continued)

(52) U.S. Cl.
CPC ............. *B60L 53/63* (2019.02); *B60L 53/302* (2019.02); *B60L 53/53* (2019.02); *B60L 53/62* (2019.02);
(Continued)

(58) Field of Classification Search
CPC ........ B60L 53/63; B60L 53/302; B60L 53/53; B60L 53/62; B60L 53/66; B60L 53/67; B60L 53/80; B60L 53/68; B60L 53/60; B60L 2240/66; B60L 2240/68; G05B 19/042; G05B 2219/2639; Y02T 10/70; Y02T 10/7072; Y02T 90/12
See application file for complete search history.

(56) References Cited

U.S. PATENT DOCUMENTS 8,478,512 B2 7/2013 Nortrup
8,996,213 B2 3/2015 Ishikawa et al.
(Continued)

FOREIGN PATENT DOCUMENTS

WO WO-2024153341 A1 * 7/2024 ............. G06Q 50/40

*Primary Examiner* — Santosh R Poudel
(74) *Attorney, Agent, or Firm* — Michael Best & Friedrich LLP

(57) ABSTRACT

A system for managing electric vehicles and charging infrastructure in high-demand conditions. An example system includes a cloud-based policy administration component configured to identify the impacted area, estimate the charging demand in that area during the traffic event, and deploy mitigating policies to electric vehicles and charging stations in the area. Example responsive actions corresponding to the mitigating policies deployed to the charging stations include preparing the charging and cooling equipment to meet the estimated charging demand, charging stationary storage batteries for mitigating estimated power-demand spikes corresponding to the estimated charging demand, and charging an inventory of swappable battery packs to meet estimated battery-swap demand corresponding to the estimated charging demand. Example responsive actions corresponding to the mitigating policies deployed to individual electric vehicles enable optimal matching of the vehicles to the charging stations.

20 Claims, 5 Drawing Sheets

(51) Int. Cl.
*B60L 53/53* (2019.01)
*B60L 53/62* (2019.01)
*B60L 53/66* (2019.01)
*B60L 53/67* (2019.01)
*B60L 53/80* (2019.01)
*G05B 19/042* (2006.01)

(52) U.S. Cl.
CPC ............... *B60L 53/66* (2019.02); *B60L 53/67* (2019.02); *B60L 53/80* (2019.02); *G05B 19/042* (2013.01); *G05B 2219/2639* (2013.01)

(56) References Cited

U.S. PATENT DOCUMENTS 9,103,686 B2 8/2015 Pettersson
9,527,403 B2 12/2016 Mardall et al.
9,759,573 B2 9/2017 Meyer et al.
10,464,547 B2 11/2019 Park et al.
10,759,298 B2 9/2020 Wang et al.
2011/0106321 A1* 5/2011 Cherian .............. H02J 13/1323 700/286
2012/0109519 A1 5/2012 Uyeki
2015/0039391 A1* 2/2015 Hershkovitz ........ G01R 31/382 705/7.31
2015/0165915 A1* 6/2015 Cun ........................ B60L 53/30 320/109
2015/0226572 A1* 8/2015 North ...................... B60L 53/68 701/400
2017/0136912 A1 5/2017 Ricci
2019/0164203 A1* 5/2019 Malik ................ G06Q 30/0283
2019/0308510 A1 10/2019 Beaurepaire et al.
2021/0110446 A1 4/2021 Khoo et al.
2021/0231450 A1 7/2021 Pedersen
2022/0194447 A1* 6/2022 Aubin ..................... B61L 27/16
2022/0410756 A1* 12/2022 Hou ........................ B60L 53/63
2023/0415604 A1* 12/2023 Sakata ................... G06Q 50/06
2024/0250544 A1* 7/2024 Vidhi ...................... B60L 53/63

* cited by examiner

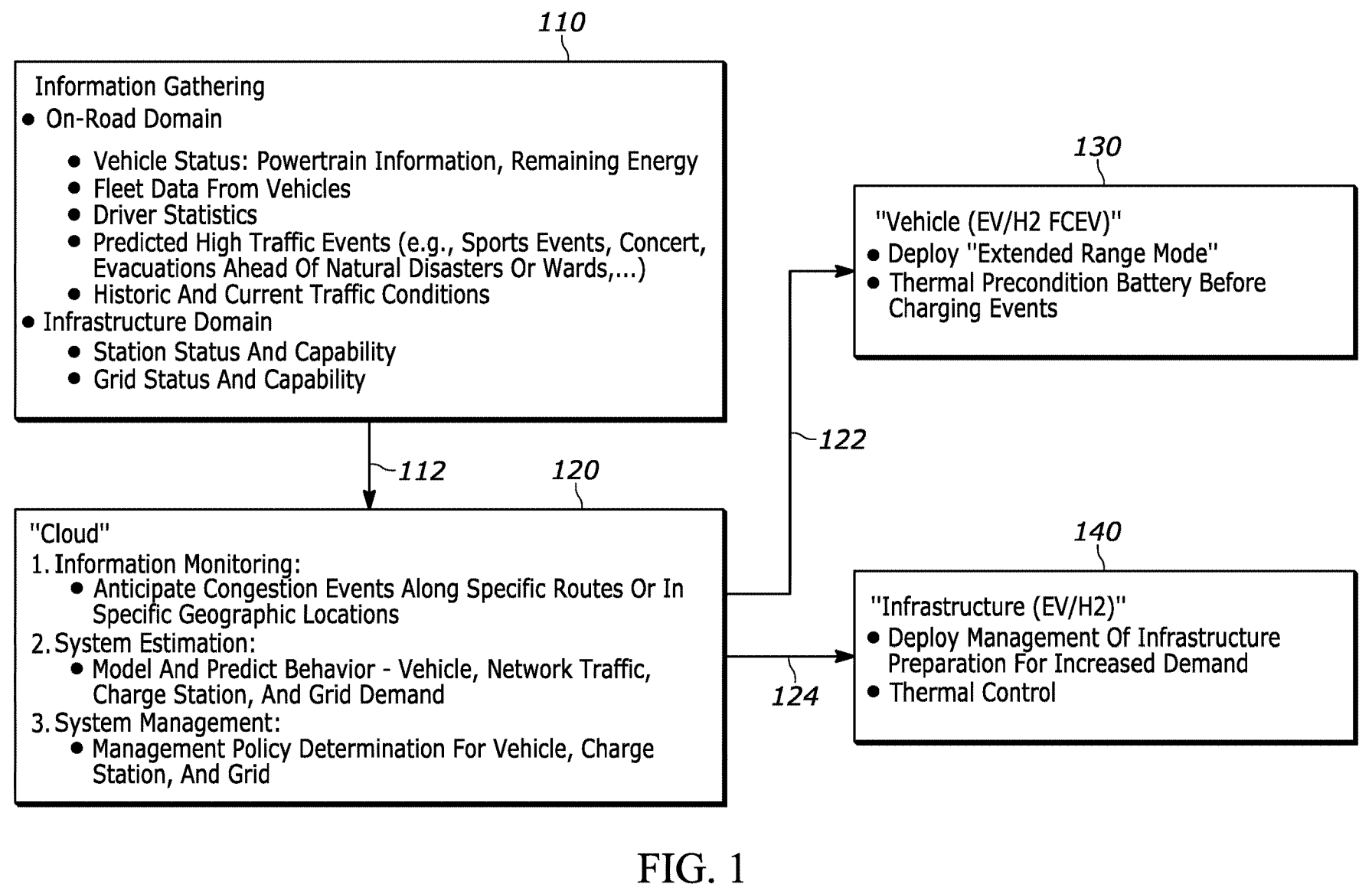

110

Information Gathering
- On-Road Domain
  - Vehicle Status: Powertrain Information, Remaining Energy
  - Fleet Data From Vehicles
  - Driver Statistics
  - Predicted High Traffic Events (e.g., Sports Events, Concert, Evacuations Ahead Of Natural Disasters Or Wards,...)
  - Historic And Current Traffic Conditions
- Infrastructure Domain
  - Station Status And Capability
  - Grid Status And Capability

112

120

"Cloud"
1. Information Monitoring:
   - Anticipate Congestion Events Along Specific Routes Or In Specific Geographic Locations
2. System Estimation:
   - Model And Predict Behavior - Vehicle, Network Traffic, Charge Station, And Grid Demand
3. System Management:
   - Management Policy Determination For Vehicle, Charge Station, And Grid

122

124

130

"Vehicle (EV/H2 FCEV)"
- Deploy "Extended Range Mode"
- Thermal Precondition Battery Before Charging Events

140

"Infrastructure (EV/H2)"
- Deploy Management Of Infrastructure Preparation For Increased Demand
- Thermal Control

FIG. 1

AUTOMATED MANAGEMENT OF ELECTRIC VEHICLES AND CHARGING INFRASTRUCTURE IN HIGH-DEMAND CONDITIONS

BACKGROUND

Field

Various examples relate generally to battery electric vehicles, fuel-cell electric vehicles, and corresponding charging and/or fueling infrastructure.

Description of the Related Art

An electric vehicle (EV) includes an electric motor to drive the vehicle, either alone or in concert with an internal-combustion engine. A battery electric vehicle uses a rechargeable battery as a sole power source to run the electric motor. A fuel cell electric vehicle uses fuel cells that generate electricity through a reaction between hydrogen and oxygen. The generated electricity is then used to run the electric motor. As used herein, the term “electric vehicle” (or “EV”) should be construed to encompass both battery electric vehicles (BEVs) and fuel-cell electric vehicles (FCEVs).

BRIEF SUMMARY

Disclosed herein are, among other things, various examples, aspects, features, and embodiments of a system for managing electric vehicles and corresponding charging infrastructure in high-demand conditions, e.g., caused by anticipatable or predictable high traffic events. In one example, the system includes a cloud-based policy administration component configured to identify the impacted geographic area, estimate the charging demand in that area during the traffic event, and deploy mitigating policies both to the electric vehicles and various elements (e.g., charging stations and grid components) of the charging infrastructure to meet the estimated charging demand. Example responsive actions corresponding to the mitigating policies deployed to the charging stations include preparing the charging equipment to meet the estimated charging demand, preparing the cooling equipment to deliver to the charging equipment a cooling capacity corresponding to the estimated charging demand, charging stationary storage batteries for mitigating estimated power-demand spikes corresponding to the estimated charging demand, and charging an inventory of swappable battery packs to meet estimated battery-swap demand corresponding to the estimated charging demand. Example responsive actions corresponding to the mitigating policies deployed to the individual electric vehicles include enacting the extended range mode, shutting down nonessential units, circuits, devices, and accessories, optimizing vehicle operations, and thermally preconditioning the battery prior to the expected charging event to enable faster charging at the corresponding charging station. Various responsive actions corresponding to the mitigating policies beneficially enable optimal matching of the electric vehicles to the charging stations.

One example provides an automated method for managing a charging infrastructure. The method includes determining, with a processor, a set of charging stations to be impacted by a traffic event predicted to cause congestion. The method also includes, for each charging station of the set of charging stations, estimating, with the processor, a respective charging demand during the traffic event. The method also includes selecting, with the processor and based on the respective charging demand, a respective mitigating policy for a respective charging station of the set of charging stations and communicating the respective mitigating policy, via an input/output interface connected to the processor, to cause an electronic controller to initiate one or more responsive actions at the respective charging station. The one or more responsive actions are selected from the group consisting of: preparing charging equipment to meet the respective charging demand; preparing cooling equipment to deliver to the charging equipment a cooling capacity corresponding to the respective charging demand; charging stationary storage batteries for mitigating estimated power-demand spikes corresponding to the respective charging demand; and charging an inventory of swappable battery packs to meet estimated battery-swap demand corresponding to the respective charging demand.

Another example provides a system for managing a charging infrastructure. The system includes a processor and memory including program code. The processor is configured, through execution of the program code, to determine a set of charging stations to be impacted by a traffic event predicted to cause congestion. The processor is also configured, for each charging station of the set of charging stations, to estimate a respective charging demand during the traffic event. The processor is also configured to select, based on the respective charging demand, a respective mitigating policy for a respective charging station of the set of charging stations and communicate the respective mitigating policy, via an input/output interface connected to the processor, to cause an electronic controller to initiate one or more responsive actions at the respective charging station. The one or more responsive actions are selected from the group consisting of: preparing charging equipment to meet the respective charging demand; preparing cooling equipment to deliver to the charging equipment a cooling capacity corresponding to the respective charging demand; charging stationary storage batteries for mitigating estimated power-demand spikes corresponding to the respective charging demand; and charging an inventory of swappable battery packs to meet estimated battery-swap demand corresponding to the respective charging demand.

Yet another example provides a non-transitory computer-readable medium storing instructions that, when executed by an electronic processor, cause the electronic processor to perform operations comprising an automated method for managing a charging infrastructure. The method includes determining, with a processor, a set of charging stations to be impacted by a traffic event predicted to cause congestion. The method also includes, for each charging station of the set of charging stations, estimating, with the processor, a respective charging demand during the traffic event. The method also includes selecting, with the processor and based on the respective charging demand, a respective mitigating policy for a respective charging station of the set of charging stations and communicating the respective mitigating policy, via an input/output interface connected to the processor, to cause an electronic controller to initiate one or more responsive actions at the respective charging station. The one or more responsive actions are selected from the group consisting of: preparing charging equipment to meet the respective charging demand; preparing cooling equipment to deliver to the charging equipment a cooling capacity corresponding to the respective charging demand; charging stationary storage batteries for mitigating estimated power-demand spikes corresponding to the respective charging demand; and charging an inventory of swappable battery packs to meet estimated battery-swap demand corresponding to the respective charging demand.

BRIEF DESCRIPTION OF THE DRAWINGS

FIG. 1 is a block diagram illustrating an automated management system according to some examples.

DETAILED DESCRIPTION

Figure 2:
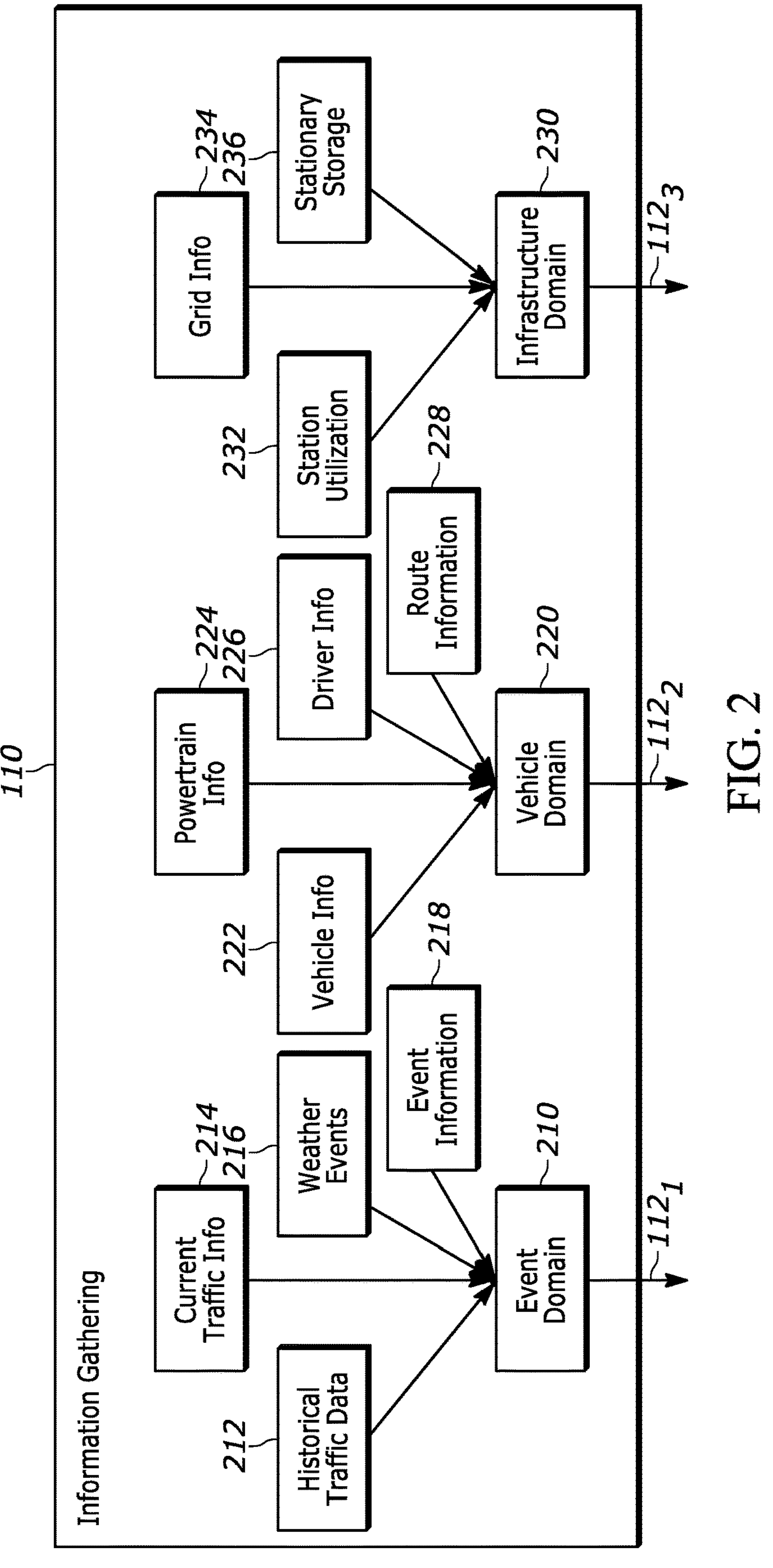
FIG. 2 is a block diagram illustrating an information gathering service of the automated management system of FIG. 1 according to some examples.

A BEV can be charged at home or at a charging station. Level 1 charging, which involves plugging the BEV into a regular electrical outlet, provides approximately five miles of range for each hour the vehicle is plugged in. A typical time to charge a 60 kWh BEV via Level 1 charging is approximately 30 hours. A Level 2 charging station uses alternating current (AC) and typically delivers about 20 A to 50 A of current. Depending on the equipment used, a Level 2 charging station provides between approximately 10 and 50 miles of range per hour of charging. A typical time to charge a 60 kWh BEV at a Level 2 charging station is approximately four hours. A Level 3 charging station uses direct current (DC) and higher voltage and current than a Level 2 charging station. Depending on the equipment used, a Level 3 charging station provides between approximately 100 and 1000 miles of range per hour of charging. A typical time to charge a 60 kWh BEV at a Level 3 charging station is approximately 30 minutes.

An FCEV uses fuel cells that generate electricity on demand via an electrochemical reaction between hydrogen and oxygen. The generated electricity is used just like the electricity drawn from the BEV's battery to power the vehicle's electric motor. Byproducts of the electrochemical reaction are water vapor and warm air. There are no carbon emissions from an FCEV. Since fuel cells rely on hydrogen fuel to operate, FCEVs need to be periodically fueled up with hydrogen, e.g., similar to the way internal-combustion-engine (ICE) vehicles are fueled with gasoline or diesel. However, unlike conventional gas stations, hydrogen-fueling stations are currently available only in a limited number of markets, such as California. Due to the scarcity of hydrogen-fueling infrastructure, existing hydrogen-fueling stations may be in high demand under some circumstances.

Certain events, such as sporting events, concerts, and evacuations in advance of forecasted natural disasters, such as hurricanes, can trigger heavy traffic and high demand for EV refueling/recharging along specific routes and/or in specific geographic areas. When not adequately handled, such high demand can potentially overwhelm the EV refueling/recharging infrastructure, thereby exacerbating traffic congestion in general and disadvantaging EV drivers in particular. For example, EV drivers may experience an increased cognitive load associated with battery-range anxiety and with the logistics of where and when to recharge or refuel the EV. As used herein below, the term "charging" an EV should be interpreted as encompassing both charging the battery of a BEV and refueling hydrogen in an FCEV.

At least some of the above-indicated problems can be addressed using various examples of methods and systems disclosed herein. Some examples improve existing approaches by anticipating congestion events, predicting driver behavior in such events, dynamically modelling the associated EV-resource consumption, predicting the charging demand, and proactively deploying mitigation policies to vehicles and/or infrastructure. From the EV driver perspective, at least some of the following improvements are provided: (i) increases of the achievable driving range under real-time traffic conditions; (ii) substantial avoidance of situations in which the EV runs out of battery charge or hydrogen fuel; and (iii) reduction of charging time when recharging or refueling is needed. From the infrastructure perspective, at least some of the following improvements are provided: (i) improvements to the charging capacity and speed; (ii) reduction of the average wait time for the EV charging service; and (iii) approximately optimal power distribution within the infrastructure.

In various examples, one or more of the following features are implemented:

(1) Utilization of information about the electric vehicle, traffic, and road to build physics-based, dynamic EV energy consumption model for better energy estimation compared with that of models relying primarily on historic usage data.

(2) EV control directed at implementing limited or constrained performance to extend the range, the EV control including control of various vehicle subsystems, such as the powertrain (PT), thermal system, and heating, ventilation, and air conditioning (HVAC) system. The data processing corresponding to the EV control functions has a substantial component implemented in the cloud and relies on information and data not limited to the current EV mode.

(3) Optimized control strategy at the charging infrastructure directed at approximately maximizing the EV service throughput, e.g., by allowing as many EVs to charge to less than full but sufficient levels as technically feasible.

In some examples, the optimized control strategy is based on a demand prediction model and a set of preconditioning measures. The demand prediction model enables various charging stations to prepare for the predicted charging demand ahead of the time. The preconditioning measures at individual charging stations include preconditioning charging ports, preparing the thermal cooling system, and increasing the battery-pack fast charging capacity for the battery swap service. The preconditioning measures for the power grid management include pre-charging stationary storage batteries at the charging stations in advance of the vehicles' arrival to reduce the power demand surges and the load on the grid and to increase the energy throughput to the EVs at the charging stations. At least some of the above-mentioned features and concepts may also be applicable to managing high traffic events involving other vehicle types, including conventional vehicles equipped with internal combustion engines.

FIG. 1 is a block diagram illustrating an automated management system 100 according to some examples. The system 100 includes a cloud-based policy administration component 120 configured to receive information streams 112 from an information gathering service 110. The cloud-based policy administration component 120 operates to monitor and process the information streams 112, with the monitoring and processing being directed at predicting and/or anticipating high traffic events, determining which vehicles and infrastructure elements are likely to be affected thereby, and taking automated responsive actions via deployment of mitigating policies 122, 124 to those vehicles and infrastructure elements, respectively. In response to the policies 122, the targeted EVs take responsive actions 130 directed, inter alia, at extending their driving ranges, navigating to respective suitable servicing locations, and/or thermally preconditioning the batteries for charging at those locations. In response to the policies 124, the targeted infrastructure elements take responsive actions 140 directed at increasing the servicing throughput. Various example elements, details, and components of the system 100 are described in more detail below in continued reference to FIG. 1 and in further reference to FIGS. 2-5.

FIG. 2 is a block diagram illustrating the information gathering service 110 of the system 100 according to some examples. In the example shown, the information gathering service 110 comprises three information gathering domains 210, 220, 230 configured to provide three information streams 112 (labeled $\mathbf{112_1}$, $\mathbf{112_2}$, and $\mathbf{112_3}$, respectively) to the cloud-based policy administration component 120. Other configurations in which the information gathering service 110 has more or fewer (than three) information gathering domains and/or provides more or fewer (than three) information streams 112 to the cloud-based policy administration component 120 are also possible in additional examples.

In operation, the information gathering domain 210 is the event domain that generates the information stream $\mathbf{112_1}$ by collecting, processing, filtering, and aggregating event-related information from a corresponding plurality of sources. For illustration purposes and without any implied limitations, FIG. 2 shows the following example sources: historical traffic data 212; real-time traffic data 214; information 216 about current and forecasted weather events capable of significantly impacting traffic, and information 218 about anticipatable and predictable high traffic events. In some examples, the historical and real-time traffic data 212, 214 are retrieved from one or more traffic-reporting services, such as U.S. Traffic Network (USTN), Google Maps, Total Traffic and Weather Network (TTWN), and the like. The information 216 is retrieved from one or more weather services, such as Accuweather, AerisWeather, Foreca, the National Weather Service, Open Weathermap, and the like. The information 218 typically covers sports events, concerts, evacuations related to natural disasters, and specific calendar dates (e.g., Chinese New Year, Independence Day, etc.) and can be retrieved from a variety of sources, such as Google Calendar API, Integrated Public Alert and Warning System (IPAWS), Eventbrite API, TrafficView, Police Departments, and the like. Herein, the acronym API stands for Application Programming Interface.

The information gathering domain 220 is the vehicle domain that generates the information stream $\mathbf{112_2}$ by collecting, processing, filtering, and aggregating vehicle-related information from a corresponding plurality of sources. For illustration purposes and without any implied limitations, FIG. 2 shows the following example sources: vehicle information 222, powertrain information 224, driver information 226, and route information 228. In some examples, the vehicle information 222 typically includes: vehicle type (e.g., car, truck, motorcycle, etc.), Make, Model, Year, Color, License Plate/Registration Number, Vehicle Identification Number (VIN), Location of Vehicle, Ownership Status and Details, Insurance information, etc. The vehicle information 222 is retrievable from a variety of databases, such as various databases maintained by state governments, insurance companies, and vehicle manufacturers. The powertrain information 224 includes various powertrain states, vehicle speed, battery state of charge (SOC), powertrain component temperatures, cabin HVAC temperature setpoints, etc. The powertrain information 224 is retrievable from individual vehicles via suitable network connections. The driver information 226 includes driver records and statistics, such as historic data that describes the driver style, aggressiveness, and driving preferences. The driver information 226 is retrievable from a variety of sources, such as the vehicle's onboard control system, individual driver's cellphone together with the corresponding location tracking service, and/or suitable network connections for the target vehicle. The route information 228 typically includes the origin, destination, and predicted route and is retrievable from the vehicle's navigation system and/or corresponding navigation service.

The information gathering domain 230 is the infrastructure domain that generates the information stream $\mathbf{112_3}$ by collecting, processing, filtering, and aggregating infrastructure-related information from a corresponding plurality of sources. For illustration purposes and without any implied limitations, FIG. 2 shows the following example sources: station utilization information 232, grid information 234, and stationary storage information 236. Representative examples of the information 232, 234, 236 include the status and capability of the charging station(s), station's charging power capability and type, station's present charging demand, status the stationary storage system at the station (if any), and power grid status and capability at the station. The information 232, 234, 236 is retrievable from a variety of sources, such as Federal Energy Regulatory Commission (FERC), state governments, the station builder, the station operator, the grid operator, and the like.

Figure 3:
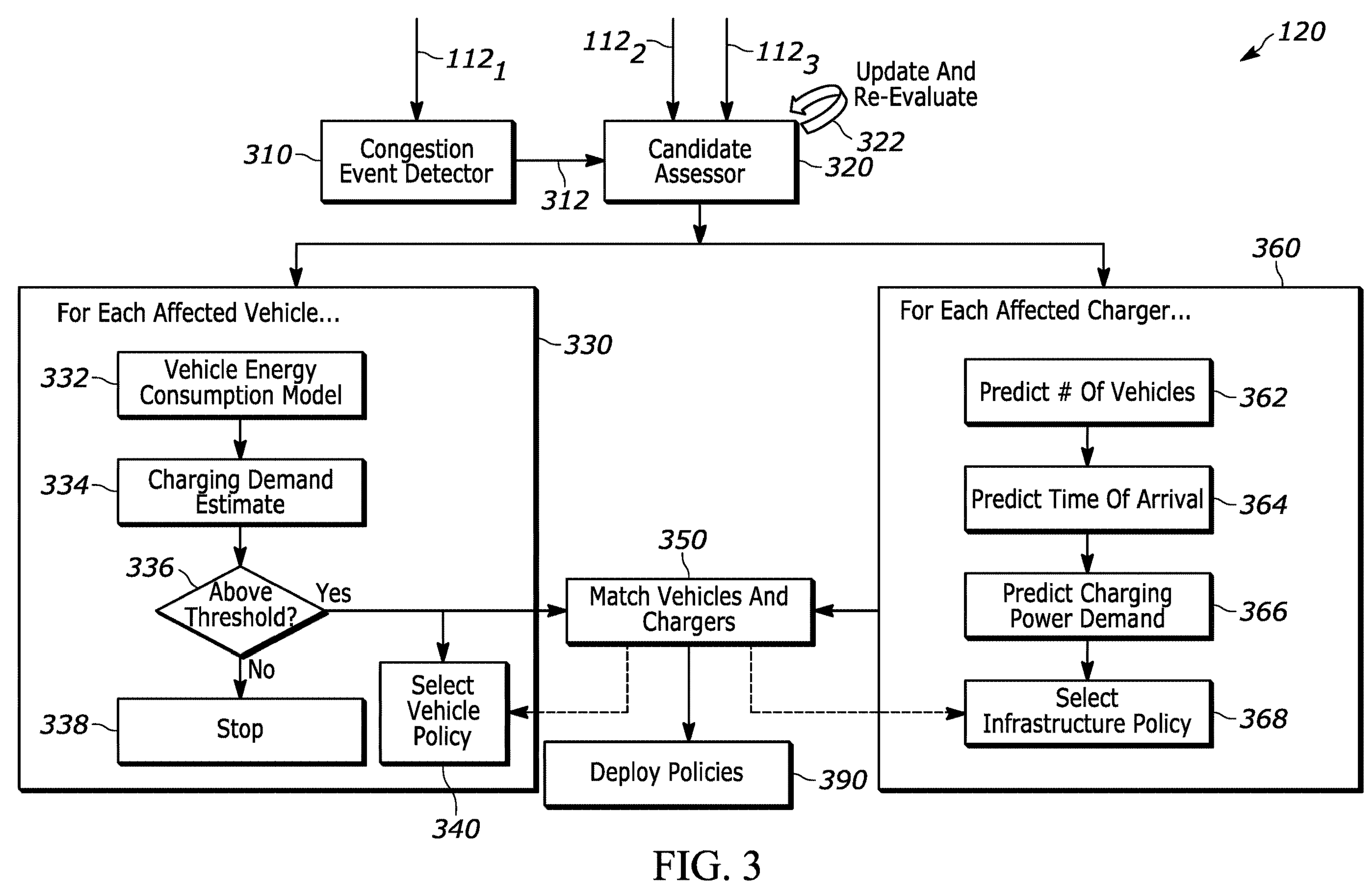
FIG. 3 is a block diagram illustrating a cloud-based policy administration component of the automated management system of FIG. 1 according to some examples.

FIG. 3 is a block diagram illustrating the cloud-based policy administration component 120 of the system 100 according to some examples. In the example shown, the cloud-based policy administration component 120 relies on the information streams $\mathbf{112_1}$, $\mathbf{112_2}$, and $\mathbf{112_3}$ provided by the information gathering service 110 illustrated in FIG. 2. The information stream $\mathbf{112_1}$ is applied to a congestion event detector 310 of the cloud-based policy administration component 120. The information streams $\mathbf{112_2}$ and $\mathbf{112_3}$ are applied to a candidate assessor 320 of the cloud-based policy administration component 120.

Based on the information stream $\mathbf{112_1}$, the congestion event detector 310 operates to proactively recognize an upcoming traffic event capable of causing significant congestion. The data provided by the information stream $\mathbf{112_1}$ are used by the congestion event detector 310 to estimate at least the geographic area of concern and timing and duration of the upcoming traffic event. The congestion event detector 310 further operates to provide these and other pertinent parameters of the recognized upcoming traffic event, via a communication signal 312, to the candidate assessor 320.

Based on the communication signal 312, the candidate assessor 320 operates to filter the information streams $\mathbf{112_2}$ and $\mathbf{112_3}$ to compile a list of electric vehicles and a list of infrastructure elements that are likely to be impacted by the upcoming traffic event. In some examples, the compiled lists are updated and/or reevaluated based on continued filtering of the information streams $\mathbf{112_2}$ and $\mathbf{112_3}$ and further based on the parameter updates received via the communication signal 312. The update/reevaluation process is schematically indicated in FIG. 3 by a looped arrow 322. For example, at least some of the updates 322 include removing from the list of vehicles the EVs that leave the geographic area of concern and adding to the list of vehicles the vehicles that enter the geographic area of concern.

For each EV on the above-indicated list of vehicles, the cloud-based policy administration component 120 operates to assess, using a respective instance of an assessment method 330, a need for changing the current operation policy deployed to or enacted at the vehicle. In some examples, multiple instances of the assessment method 330 run in parallel, with each of such instances corresponding to a different respective EV from the list. The assessment method 330 typically relies on at least some information (processed or unprocessed) provided by the information streams $\mathbf{112}_1$-$\mathbf{112}_3$ to populate one or more systematic mathematical models that represent, approximate, and/or predict the system behavior. Several examples of such models include but are not limited to a physics-based vehicle's resource consumption model, a driver model, and a traffic model.

In some examples, the physics-based vehicle's resource consumption model uses the dynamic component status (such as torque and speed) available via the Controller Area Network (also referred to as the CAN bus) and data about the battery power to estimate various dynamic parameters of the vehicle, such as the vehicle drag and mass, and further to estimate vehicle energy consumption, including the powertrain component efficiency. The driver model uses driver statistics, road condition data, and traffic condition information to estimate future behavior of the driver, e.g., in the form of predicted future speed profile of the vehicle. The traffic model uses traffic congestion information, speeds of vehicles on the road, and stoppage information to estimate the traffic flow on the road and the average speed in various geographic areas.

In a representative example, the method 330 includes populating the physics-based vehicle's resource consumption model with various parameter values corresponding to this vehicle (in a block 332) and running the populated model to obtain a charging demand estimate for this vehicle (in a block 334). The method 330 also includes comparing the estimate obtained in the block 334 with an applicable threshold value to decide whether a change in the vehicle policy is warranted (in a decision block 336). If the estimate is at or below the threshold value ("No" at the decision block 336), then the processing of this instance of the method 330 is terminated (in a block 338) without a policy change, i.e., the current vehicle policy remains in effect. If the estimate is above the threshold value ("Yes" at the decision block 336), then a new vehicle policy is selected for the vehicle (in a block 340). In some examples, the new vehicle policy is directed at enabling the corresponding EV to successfully reach a charging station under the traffic conditions imposed by the congestion event.

For each charging station on the above-mentioned list of infrastructure elements, the cloud-based policy administration component 120 operates to assess, using a respective instance of an assessment method 360, a respective charging demand. In some examples, multiple instances of the assessment method 360 run in parallel, with each of such instances corresponding to a different respective charging station from the list. The assessment method 360 is used, e.g., to estimate the number of vehicles and their respective arrival times at the charging station. The assessment method 360 is further used to predict the charging power demand at the charging station, e.g., using the present real-time charging power demand, above-indicated estimates, previous statistics, and traffic information.

In a representative example, the method 360 includes estimating the number of EVs expected to arrive at the charging station during the upcoming traffic event (in a block 362). The method 360 also includes estimating the vehicles' arrival times at the charging station (in a block 364). The estimating of the blocks 362, 364 is based, at least in part, on the above-mentioned driver and traffic models and is further based on the information streams $\mathbf{112}_1$-$\mathbf{112}_3$ and the communication signal 312. The method 360 also includes predicting the charging power demand at the charging station (in a block 366). The prediction obtained in the block 366 typically relies on the estimates obtained in the blocks 362, 364, which are used as inputs to the applicable charging power consumption model. The method 360 also includes selecting a suitable infrastructure policy (in a block 368). The infrastructure policy selected in the block 368 is typically directed at enabling the charging station to successfully handle the predicted charging demand during the upcoming traffic event.

The cloud-based policy administration component 120 further operates to match the EVs predicted to be charged in the impacted area during the upcoming traffic event with individual charging stations in the impacted area. In one example, such matching is performed using an optimizer 350 running an optimization algorithm directed at recommending pairing relationships between the pool of vehicles and the pool of charging stations in the impacted area. The optimization algorithm is typically directed at iteratively determining the pairing relationships so that the charging demand of individual vehicles is substantially fully accommodated by the respective throughput capacities of the corresponding individual stations upon the policy deployments of the blocks 340, 368. In some cases, the optimizer 350 operates to trigger a new selection of the policies in the blocks 340, 368 when the optimization convergence criteria are not met. The optimizer 350 further operates to trigger a deployment 390 of the selected policies to the individual vehicles and individual charging stations when the optimization convergence criteria are met. The deployment 390 is an example of the above-mentioned deployment of policies 122, 124 (see FIG. 1). The deployment 390 includes communicating the corresponding policy 122 or 124 to the electronic controller of the corresponding system component to initiate one or more responsive actions thereat.

Figure 4:
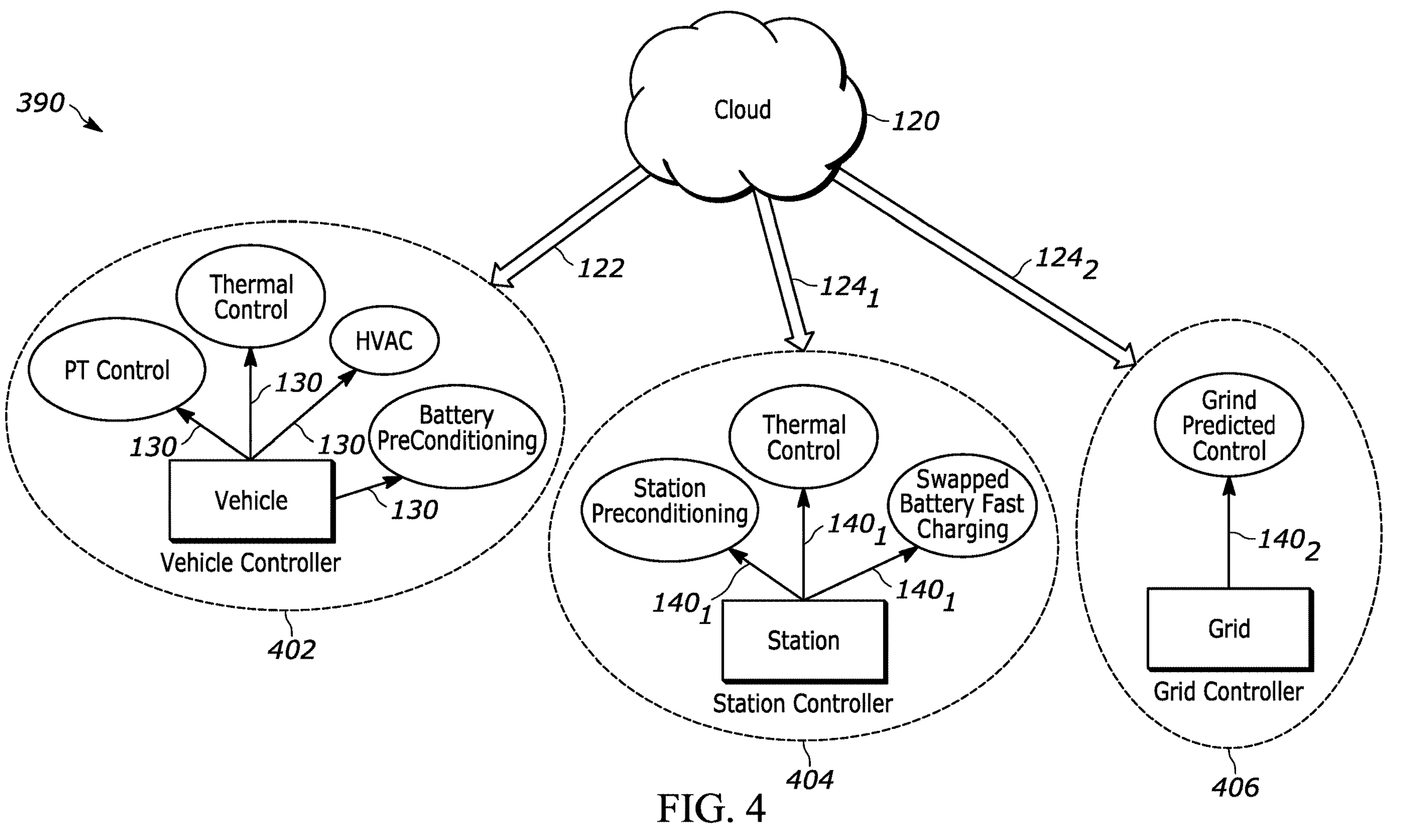
FIG. 4 is a block diagram illustrating policy deployment in the automated management system of FIG. 1 according to some examples.

FIG. 4 is a block diagram illustrating the deployment 390 according to some examples. As shown, the deployment 390 includes deployment of the policies 122, $\mathbf{124}_1$, and $\mathbf{124}_2$ to the EVs, charging stations, and grid(s), respectively. The policies are typically received by the corresponding electronic controllers. In response to the received policies, the electronic controllers implement or cause the corresponding responsive actions 130, 140 at the respective controlled entities of the system 100 (also see FIG. 1). For illustration purposes and without any implied limitations, the deployment 390 is shown and described below in reference to an electronic controller 402 of an individual EV, an electronic controller 404 of an individual charging station, and an electronic controller 406 of an individual grid. A person of ordinary skill in the pertinent art will readily recognize that, in some examples, the deployment 390 handles different numbers of electronic controllers, including examples in which there are multiple electronic controllers in some or all of the illustrated three categories, i.e., vehicle controllers 402, station controllers 404, and/or grid controllers 406.

In some examples, in response to the policies 122, the EV's electronic controller 402 operates to implement or cause at least some of the following example responsive actions 130: (i) enacting an extended range mode, which imposes performance limits, such as driving dynamic limits on speed and acceleration, HVAC set-point limits on cabin heating and cooling, and limits on the thermal cooling demand (e.g., by commanding less-aggressive PT-component thermal setpoints); (ii) shutting down some or all nonessential units, circuits, devices, and accessories; (iii) adapting or optimizing vehicle operations, e.g., by increasing some regeneration setpoints, lowering the ride height, and the like; (iv) thermally preconditioning the battery prior to the expected charging event to enable faster charging time at the corresponding charging station; and (v) indicating infeasibility of the trip demand and suggesting a different route, including routes through the charging station suggested by the cloud-based policy administration component 120. In some examples, the responsive actions 130 are implemented automatically or offered to the driver as an option for approval. In some examples, the driver has the ultimate control over the vehicle and can disregard the policies 122 and/or ban corresponding responsive actions 130.

In some examples, in response to the policies $\mathbf{124}_1$, and $\mathbf{124}_2$, the station controller 404 and the grid controller 406 operate to implement or cause responsive actions 140 and 140, respectively. Examples of various responsive actions 140 include but are not limited to the following actions: (i) adapting the charging rates for the vehicles currently in the charging station to increase throughput; (ii) preparing the station's charging equipment for increased demand, e.g., by preconditioning the charging equipment and charging ports for larger throughput and by preparing the corresponding cooling system to deliver to the charging equipment a cooling capacity corresponding to the charging demand; (iii) charging stationary storage batteries at the station to mitigate spikes in power demand for the grid; (iv) when battery swap service is included, charging the existing inventory of battery packs to meet estimated swap demand; and (v) preparing the power-grid system for the estimated increase in the power load, e.g., by reallocating some of the present power load away from the affected geographic area and/or increasing generator output to a level sufficient for the estimated demand in the affected geographic area.

Figure 5:
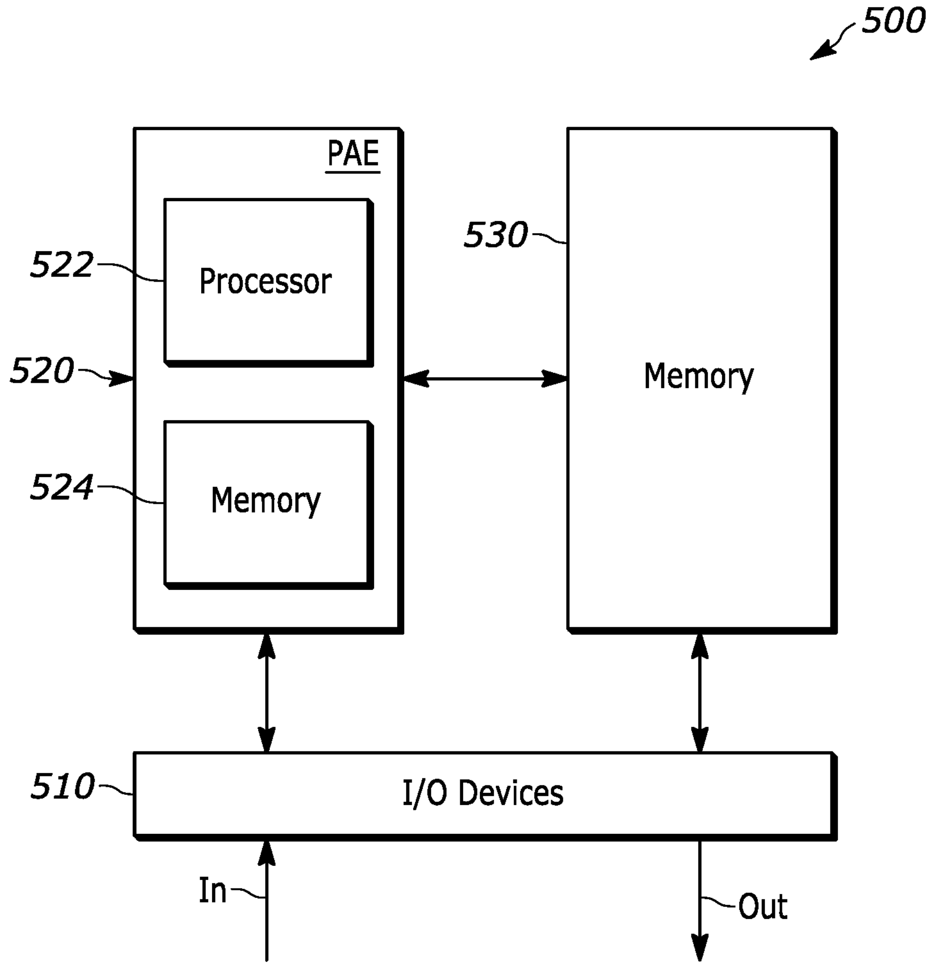
FIG. 5 is a block diagram illustrating a computing device according to some examples.

FIG. 5 is a block diagram illustrating a computing device 500 according to some examples. Several instances of the device 500 are typically used in various parts of the system 100, such as the cloud-based policy administration component 120 and the electronic controllers 402, 404, 406. The device 500 comprises input/output (I/O) devices 510, a policy administration engine (PAE) 520, and a memory 530. The I/O devices 510 are used to enable the device 500 to receive various inputs (e.g., 112, 122, 124, 212-218, 222-228, 232-236) from external devices and data sources and to transmit various outputs (e.g., 112, 122, 124) to external devices and data sinks. The I/O devices 510 may also be used to connect the device 500 to a display and a user interface.

In some examples, the memory 530 has buffers to receive and temporarily store data. The memory 530 operates to share the data with the PAE 520, e.g., for executing operations of various methods described herein. The PAE 520 includes a processor 522 and a memory 524. The memory 524 operates to store therein program code, which when executed by the processor 522 enables the PAE 520 to perform various operations associated with policy administration by executing the corresponding portions of the program code. In some examples, the program code implements various ones of the above-mentioned computer models, data filtering, generation of control messages or commands, and other computing for the corresponding component of the system 100.

According to one example disclosed above, e.g., in the summary section and/or in reference to any one or any combination of some or all of FIGS. 1-5, provided is an automated method for managing a charging infrastructure, the method comprising: determining, with a processor, a set of charging stations to be impacted by a traffic event predicted to cause congestion; for each charging station of the set of charging stations, estimating, with the processor, a respective charging demand during the traffic event; selecting, with the processor and based on the respective charging demand, a respective mitigating policy for a respective charging station of the set of charging stations; and communicating the respective mitigating policy, via an input/output interface connected to the processor, to cause an electronic controller to initiate one or more responsive actions at the respective charging station, the one or more responsive actions being selected from the group of actions consisting of: preparing charging equipment to meet the respective charging demand; preparing cooling equipment to deliver to the charging equipment a cooling capacity corresponding to the respective charging demand; charging stationary storage batteries for mitigating estimated power-demand spikes corresponding to the respective charging demand; and charging an inventory of swappable battery packs to meet estimated battery-swap demand corresponding to the respective charging demand.

In some examples of the above automated method, the determining comprises filtering, with the processor, traffic-event related information received through the input/output interface.

In some examples of any of the above automated methods, the determining further comprises collecting the traffic-event related information from one or more information sources selected from the group of information sources consisting of: historical traffic data; real-time traffic data; information about weather events capable of impacting traffic in a geographic area of the traffic event, and information about anticipatable or predictable high traffic events.

In some examples of any of the above automated methods, the automated method further comprises: identifying, with the processor, a plurality of electric vehicles that need charging in the geographic area during the traffic event; matching, with the processor, each electric vehicle of the plurality of electric vehicles with a corresponding charging station of the set of charging stations for charging thereat, the matching being performed to accommodate charging needs of individual electric vehicles of the plurality of electric vehicles; and communicating results of the matching, via the input/output interface, to the individual electric vehicles.

In some examples of any of the above automated methods, the identifying comprises receiving geolocation information, via the input/output interface, from a vehicle navigation system.

In some examples of any of the above automated methods, the identifying comprises retrieving vehicle information of the individual electric vehicles, via the input/output interface, from a database.

In some examples of any of the above automated methods, the matching is performed using powertrain information of the individual electric vehicles.

In some examples of any of the above automated methods, the matching is performed using driver information corresponding to the individual electric vehicles.

In some examples of any of the above automated methods, the matching is performed using route information corresponding to the individual electric vehicles.

In some examples of any of the above automated methods, the matching is performed using iterative adjustment of vehicle policies for the individual electric vehicles.

In some examples of any of the above automated methods, the matching is performed using iterative adjustment of the respective mitigating policy of at least one charging station of the set of charging stations.

In some examples of any of the above automated methods, the matching includes estimating times of arrival of the individual electric vehicles to different ones of the set of charging stations.

According to another example disclosed above, e.g., in the summary section and/or in reference to any one or any combination of some or all of FIGS. 1-5, provided is a system for managing a charging infrastructure, the system comprising: a processor; and memory including program code; wherein the processor is configured, through execution of the program code to: determine a set of charging stations to be impacted by a traffic event predicted to cause congestion; for each charging station of the set of charging stations, estimate a respective charging demand during the traffic event; select, based on the respective charging demand, a respective mitigating policy for a respective charging station of the set of charging stations; and communicate the respective mitigating policy, via an input/output interface connected to the processor, to cause an electronic controller to initiate one or more responsive actions at the respective charging station, the one or more responsive actions being selected from the group of actions consisting of: preparing charging equipment to meet the respective charging demand; preparing cooling equipment to deliver to the charging equipment a cooling capacity corresponding to the respective charging demand; charging stationary storage batteries for mitigating estimated power-demand spikes corresponding to the respective charging demand; and charging an inventory of swappable battery packs to meet estimated battery-swap demand corresponding to the respective charging demand.

In some examples of the above system, the processor is further configured, through execution of the program code, to filter traffic-event related information received through the input/output interface.

In some examples of any of the above systems, the processor is further configured, through execution of the program code, to collect the traffic-event related information from one or more information sources selected from the group of information sources consisting of: historical traffic data; real-time traffic data; information about weather events capable of impacting traffic in a geographic area of the traffic event, and information about anticipatable or predictable high traffic events.

In some examples of any of the above systems, the processor is further configured, through execution of the program code, to: identify a plurality of electric vehicles that need charging in a geographic area of the traffic event during the traffic event; perform matching of each electric vehicle of the plurality of electric vehicles with a corresponding charging station of the set of charging stations for charging thereat, the matching being performed to accommodate charging needs of individual electric vehicles of the plurality of electric vehicles; and communicate results of the matching, via the input/output interface, to the individual electric vehicles.

In some examples of any of the above systems, the processor is further configured, through execution of the program code, to: receive geolocation information, via the input/output interface, from a vehicle navigation system; and retrieve vehicle information of the individual electric vehicles, via the input/output interface, from a database.

In some examples of any of the above systems, the matching is performed using powertrain information of the individual electric vehicles.

In some examples of any of the above systems, the matching is performed using one or more of the following: driver information corresponding to the individual electric vehicles; route information corresponding to the individual electric vehicles; iterative adjustment of vehicle policies for the individual electric vehicles; and iterative adjustment of the respective mitigating policy of at least one charging station of the set of charging stations.

According to yet another example disclosed above, e.g., in the summary section and/or in reference to any one or any combination of some or all of FIGS. 1-5, provided is a non-transitory computer-readable medium storing instructions that, when executed by an electronic processor, cause the electronic processor to perform operations comprising an automated method for managing a charging infrastructure, the method including: determining, with the electronic processor, a set of charging stations to be impacted by a traffic event predicted to cause congestion; for each charging station of the set of charging stations, estimating, with the electronic processor, a respective charging demand during the traffic event; selecting, with the electronic processor and based on the respective charging demand, a respective mitigating policy for a respective charging station of the set of charging stations; and communicating the respective mitigating policy, via an input/output interface connected to the electronic processor, to cause an electronic controller to initiate one or more responsive actions at the respective charging station, the one or more responsive actions being selected from the group of actions consisting of: preparing charging equipment to meet the respective charging demand; preparing cooling equipment to deliver to the charging equipment a cooling capacity corresponding to the respective charging demand; charging stationary storage batteries for mitigating estimated power-demand spikes corresponding to the respective charging demand; and charging an inventory of swappable battery packs to meet estimated battery-swap demand corresponding to the respective charging demand.

It is to be understood that the above description is intended to be illustrative and not restrictive. Many implementations and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future examples. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as “a,” “the,” “said,” etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed subject matter incorporate more features than are expressly recited in each claim. Rather, as the following claims reflect, inventive subject matter lies in fewer than all features of a single disclosed example. Thus, the following claims are hereby incorporated into the Detailed Description, with each claim standing on its own as a separately claimed subject matter.

Unless explicitly stated otherwise, each numerical value and range should be interpreted as being approximate as if the word "about" or "approximately" preceded the value or range.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the terms "circuit," "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An automated method for managing a charging infrastructure, the method comprising:

determining, with a processor, a set of charging stations to be impacted by a traffic event predicted to cause congestion;

identifying, with the processor, a plurality of electric vehicles that need charging in a geographic area of the traffic event during the traffic event;

for each charging station of the set of charging stations, estimating, with the processor, a respective charging demand during the traffic event;

selecting, with the processor and based on the estimated respective charging demand during the traffic event, a respective first mitigating policy for a respective charging station of the set of charging stations, a respective second mitigating policy for a respective electric vehicle of the plurality of electric vehicles, and a respective third mitigating policy for a respective power-grid system to which the respective charging station is connected, wherein the respective first, second, and third mitigating policies are selected using a common policy-administration operation executed in response to the traffic event, the respective first, second, and third mitigating policies being directed at managing the charging infrastructure for the estimated charging demand;

communicating the respective first mitigating policy, via an input/output interface connected to the processor, to cause an electronic station controller to initiate one or more first responsive actions at the respective charging station;

communicating the respective second mitigating policy, via the input/output interface connected to the processor, to cause an electronic vehicle controller to initiate one or more second responsive actions at the respective electric vehicle; and communicating the respective third mitigating policy, via the input/output interface connected to the processor, to cause an electronic grid controller to initiate one or more third responsive actions at the respective power-grid system.

2. The automated method of claim 1, wherein the determining comprises filtering, with the processor, traffic-event related information received through the input/output interface.

3. The automated method of claim 2, wherein the determining further comprises collecting the traffic-event related information from one or more information sources selected from the group of information sources consisting of: historical traffic data; real-time traffic data; information about weather events capable of impacting traffic in a geographic area of the traffic event, and information about anticipatable or predictable high traffic events.

4. The automated method of claim 1, further comprising:

matching, with the processor, each electric vehicle of the plurality of electric vehicles with a corresponding charging station of the set of charging stations for charging thereat, the matching being performed to accommodate charging needs of individual electric vehicles of the plurality of electric vehicles; and communicating results of the matching, via the input/output interface, to the individual electric vehicles.

5. The automated method of claim 4, wherein the identifying comprises receiving geolocation information, via the input/output interface, from a vehicle navigation system.

6. The automated method of claim 4, wherein the identifying comprises retrieving vehicle information of the individual electric vehicles, via the input/output interface, from a database; and wherein the matching is performed using powertrain information of the individual electric vehicles.

7. The automated method of claim 4, wherein the matching is performed using:

driver information corresponding to the individual electric vehicles; and route information corresponding to the individual electric vehicles.

8. The automated method of claim 4, wherein the matching includes estimating times of arrival of the individual electric vehicles to different ones of the set of charging stations.

9. The automated method of claim 1, wherein the one or more first responsive actions is/are selected from the group of actions consisting of:

preparing charging equipment to meet the respective charging demand;

preparing cooling equipment to deliver to the charging equipment a cooling capacity corresponding to the respective charging demand;

charging stationary storage batteries for mitigating estimated power-demand spikes corresponding to the respective charging demand; and charging an inventory of swappable battery packs to meet estimated battery-swap demand corresponding to the respective charging demand.

10. The automated method of claim 1, wherein the one or more second responsive actions is/are selected from the group of actions consisting of:

enacting an extended range mode;

shutting down one or more nonessential units, circuits, devices, and accessories;

changing a vehicle regeneration setpoint;

changing a vehicle ride height;

thermally preconditioning a vehicle battery;

indicating trip infeasibility; and suggesting a different route.

11. The automated method of claim 1, wherein the one or more third responsive actions is/are selected from the group of actions consisting of:

preparing the power-grid system for the estimated charging demand;

reallocating a portion of a present power load to charging stationary storage batteries at the respective charging station; and increasing generator output to a level sufficient for the estimated demand in the geographic area.

12. The automated method of claim 1, wherein the common policy-administration operation is configured to deploy mitigating policies to electric vehicles, charging stations, and power grid systems in response to the traffic event.

13. A system for managing a charging infrastructure, the system comprising:

a hardware processor; and memory including program code;

wherein the hardware processor is configured, through execution of the program code to:

determine a set of charging stations to be impacted by a traffic event predicted to cause congestion;

identify a plurality of electric vehicles that need charging in a geographic area of the traffic event during the traffic event;

for each charging station of the set of charging stations, estimate a respective charging demand during the traffic event;

select, based on the estimated respective charging demand during the traffic event, a respective first mitigating policy for a respective charging station of the set of charging stations, a respective second mitigating policy for a respective electric vehicle of the plurality of electric vehicles, and a respective third mitigating policy for a respective power-grid system to which the respective charging station is connected, wherein the respective first, second, and third mitigating policies are selected using a common policy-administration operation executed in response to the traffic event, the respective first, second, and third mitigating policies being directed at managing the charging infrastructure for the estimated charging demand;

communicate the respective first mitigating policy, via an input/output interface connected to the hardware processor, to cause an electronic controller to initiate one or more first responsive actions at the respective charging station;

communicate the respective second mitigating policy, via the input/output interface connected to the hardware processor, to cause an electronic vehicle controller to initiate one or more second responsive actions at the respective electric vehicle; and communicate the respective third mitigating policy, via the input/output interface connected to the hardware processor, to cause an electronic grid controller to initiate one or more third responsive actions at the respective power-grid system.

14. The system of claim 13, wherein the hardware processor is further configured, through execution of the program code, to filter traffic-event related information received through the input/output interface.

15. The system of claim 14, wherein the hardware processor is further configured, through execution of the program code, to collect the traffic-event related information from one or more information sources selected from the group of information sources consisting of: historical traffic data; real-time traffic data; information about weather events capable of impacting traffic in a geographic area of the traffic event, and information about anticipatable or predictable high traffic events.

16. The system of claim 13, wherein the hardware processor is further configured, through execution of the program code, to:

perform matching of each electric vehicle of the plurality of electric vehicles with a corresponding charging station of the set of charging stations for charging thereat, the matching being performed to accommodate charging needs of individual electric vehicles of the plurality of electric vehicles; and communicate results of the matching, via the input/output interface, to the individual electric vehicles.

17. The system of claim 16, wherein the hardware processor is further configured, through execution of the program code, to:

receive geolocation information, via the input/output interface, from a vehicle navigation system; and retrieve vehicle information of the individual electric vehicles, via the input/output interface, from a database.

18. The system of claim 16, wherein the matching is performed using one or more of the following:

driver information corresponding to the individual electric vehicles;

route information corresponding to the individual electric vehicles;

iterative adjustment of vehicle policies for the individual electric vehicles; and iterative adjustment of the respective first mitigating policy of at least one charging station of the set of charging stations.

19. The system of claim 16, wherein the matching is performed using powertrain information of the individual electric vehicles.

20. A non-transitory computer-readable medium storing instructions that, when executed by an electronic processor, cause the electronic processor to perform operations comprising an automated method for managing a charging infrastructure, the method including:

determining, with a processor, a set of charging stations to be impacted by a traffic event predicted to cause congestion;

identifying, with the processor, a plurality of electric vehicles that need charging in a geographic area of the traffic event during the traffic event;

for each charging station of the set of charging stations, estimating, with the processor, a respective charging demand during the traffic event;

selecting, with the processor and based on the estimated respective charging demand during the traffic event, a respective first mitigating policy for a respective charging station of the set of charging stations, a respective second mitigating policy for a respective electric vehicle of the plurality of electric vehicles, and a respective third mitigating policy for a respective power-grid system to which the respective charging station is connected, wherein the respective first, second, and third mitigating policies are selected using a common policy-administration operation executed in response to the traffic event, the respective first, second, and third mitigating policies being directed at managing the charging infrastructure for the estimated charging demand;

communicating the respective first mitigating policy, via an input/output interface connected to the processor, to cause an electronic station controller to initiate one or more first responsive actions at the respective charging station;

communicating the respective second mitigating policy, via the input/output interface connected to the processor, to cause an electronic vehicle controller to initiate one or more second responsive actions at the respective electric vehicle; and communicating the respective third mitigating policy, via the input/output interface connected to the processor, to cause an electronic grid controller to initiate one or more third responsive actions at the respective power-grid system.

* * * * *